United States Patent [19]
Ono et al.

[11] Patent Number: 5,680,703
[45] Date of Patent: Oct. 28, 1997

[54] METHOD OF MANUFACTURING PRESSURE REGULATOR

[75] Inventors: Tomohiro Ono, Maebashi; Shinichi Hagiwara, Isesaki; Yoshiaki Arai, Kiryu, all of Japan

[73] Assignee: Mitsuba Corporation, Gunma, Japan

[21] Appl. No.: 767,533

[22] Filed: Dec. 16, 1996

[30] Foreign Application Priority Data

Dec. 25, 1995 [JP] Japan .................................. 7-350880

[51] Int. Cl.$^6$ .................................................. B23P 15/00
[52] U.S. Cl. .................. 29/890.13; 29/509; 29/890.126; 137/15; 137/510
[58] Field of Search ....................... 123/457, 463; 137/510; 251/335.2, 61.5; 29/505, 509, 890.126, 890.13

[56] References Cited

U.S. PATENT DOCUMENTS

| | | | |
|---|---|---|---|
| 2,418,448 | 4/1947 | Arbogast | 29/890.13 |
| 3,785,029 | 1/1974 | McClellan | 29/890.13 |
| 4,936,342 | 6/1990 | Kojima et al. | 137/510 |
| 5,018,500 | 5/1991 | Triolo | 137/510 |
| 5,163,472 | 11/1992 | Takada et al. | 123/457 |
| 5,197,192 | 3/1993 | Wylie et al. | 29/890.126 |
| 5,609,138 | 3/1997 | Mutschler | 123/463 |

FOREIGN PATENT DOCUMENTS

4-341669 11/1992 Japan .

*Primary Examiner*—Denise L. Ferensic
*Assistant Examiner*—Ramyar M. Farid
*Attorney, Agent, or Firm*—McCormick, Paulding & Huber

[57] ABSTRACT

There is disclosed a method of manufacturing, in which a diaphragm not provided with an annular rib is fastened to a housing through a spring casing. The method of manufacturing comprises: a process, in which supports of a supporting slider rested on a floating block through a supporting spring, which is mounted in a receiving chamber of a lower die are made to extend through fluid passing holes of the housing, and the housing is rested on the supporting slider; a process, in which a spring casing is set in a receiving cavity of an upper punch vertically movably disposed at a position upwardly of the lower die, with an end portion of an opening of the spring casing being opposed to the housing; a process, in which the upper is approachingly moved toward the lower die, whereby the diaphragm is pressed through a coil spring for regulating pressure which is assembled in the spring casing so that the outer peripheral portion of the diaphragm is brought into contact with the flange of the housing; and a process, in which the downward movement of the upper punch toward the lower die is continued, whereby the end portion of the opening of the spring casing is bent to an end face of the housing under the cooperation between the upper punch and the lower die so that a staking forming is carried out.

9 Claims, 8 Drawing Sheets

METHOD OF MANUFACTURING PRESSURE REGULATOR

BACKGROUND OF THE INVENTION

1. Field of the Invention

The present invention relates generally to a method of manufacturing a pressure regulator and more particularly to improvements in processes of assembling a diaphragm in the method of manufacturing the pressure regulator, and is concerned with a method of manufacturing effective in use, for example, for manufacturing a pressure control valve for controlling a fuel supply value in accordance with the fuel pressure and for manufacturing a fuel damper for attenuating pulsations of the discharge pressure of a fuel pump.

2. Related Art Statement

In general, in a vehicle such as a motor car, there is used a fuel pressure control valve provided with a diaphragm in a fuel supply path for delivering the fuel in a fuel tank to an engine. In the above-described pressure control valve, fluid passing holes communicated with a pressure control chamber are formed in a valve housing which forms the pressure control chamber together with a diaphragm unit, and a valve body for controlling the flow of the fuel, which is interlocked with the diaphragm, is mounted to an inlet of a fuel discharge path.

In the prior art, in the above-described pressure control valve, after the diaphragm is subjected to the staking work and fixed, a spring for regulating pressure is set on the diaphragm. Subsequently, a spring casing is mounted to the valve housing so as to cover the diaphragm and the spring, and the casing is subjected to the staking work and fixed to the housing. Thus, a double staking construction is adopted.

Now, in the double staking construction, it is necessary to provide a diaphragm holder as a part of the diaphragm unit and also it becomes necessary to provide a special process for staking the casing to the housing, whereby such a disadvantage is presented that the workability is low.

Then, there has been proposed a single staking construction, in which the diaphragm and the spring for regulating pressure are staked simultaneously. According to this single staking construction, the diaphragm holder as the part of the diaphragm unit can be dispensed with so that the special process for staking the spring casing to the housing can be dispensed with.

Now, when the casing is staked to the housing, the diaphragm is in a free state of not being positioned with respect to the casing and the housing, whereby a shift occurs between the diaphragm and the casing so that the outer peripheral portion of the diaphragm is bitten into the casing. As a result, there are possibilities of that the fuel leakage may take place from the bitten-in portion of the diaphragm, whereby it takes time for the inspection after the assembling so that the manufacturing efficiency is low.

Then, as described in Japanese Patent Laid-Open No. 4-341669, there is proposed a method of manufacturing, in which an annular recess is formed on a surface of the housing, to which the diaphragm is mounted, i.e. a surface of a flange portion and an annular rib to be coupled into the aforesaid annular recess on the flange portion is bulgedly formed on the diaphragm, whereby the diaphragm and the casing are staked to the housing simultaneously while preventing the diaphragm and the casing from being shifted in position from each other.

However, when the annular recess is formed on the housing and the annular rib is bulgedly formed on the diaphragm, the number of processes of works for forming the annular recess and the annular rib is increased so that the manufacturing costs are raised.

SUMMARY OF THE INVENTION

It is an object of the present invention is to provide a method of manufacturing a pressure regulator, in which a diaphragm and a spring casing can be fastened to a housing simultaneously without providing an annular rib on the diaphragm while preventing the diaphragm and the casing from being shifted in position from each other.

The pressure regulator manufactured according to the present invention includes: a housing, in which a large-diameter tubular portion having a bottom wall portion at one end thereof and a flange at the other end thereof and a small-diameter tubular portion formed integrally with the aforesaid bottom wall portion are formed, and a plurality of fluid passing holes are formed in the aforesaid bottom wall portion; a diaphragm disposed on an end face of the aforesaid flange, definedly formed by the flange and the housing and definingly forming a pressure control chamber for communicating a fluid flow path in the aforesaid small-diameter tubular portion with the aforesaid fluid passing holes; and a spring casing clamping the outer peripheral portion of the aforesaid diaphragm, being staked to the aforesaid housing and definingly forming a spring chamber by the aforesaid diaphragm and itself. The method of manufacturing the pressure regulator comprises: a process, in which supports of a supporting slider rested on a floating block mounted in a receiving chamber of a lower die for forming through a supporting spring are made to extend through the aforesaid fluid passing holes, whereby the aforesaid housing is rested on the aforesaid supporting slider; a process, in which the aforesaid diaphragm is rested on the aforesaid supports; a process, in which the aforesaid spring casing is set in a receiving cavity of an upper punch for forming, which is relatively, vertically movably disposed at a position upwardly of the aforesaid lower die for forming, with an end portion of an opening of the aforesaid spring casing being opposed to the aforesaid housing; a process, in which the aforesaid upper punch for forming is relatively, approachingly moved toward the aforesaid lower die for forming, whereby the aforesaid diaphragm is pressed through a coil spring for regulating pressure, which is assembled in the aforesaid spring casing, whereby the outer peripheral portion of the aforesaid diaphragm is brought into contact with the aforesaid flange of the housing; and a process, in which the relatively approaching movement of the aforesaid upper punch for forming toward the aforesaid lower die for forming is continued, whereby the end portion of the opening of the aforesaid casing is bent to an end face of the aforesaid housing and staked under the cooperation between the aforesaid upper punch for forming and the aforesaid lower die for forming.

The method of manufacturing a pressure control valve according to the present invention comprises: a process of preparing a housing, in which a large-diameter tubular portion having a bottom wall portion at one end thereof and a flange at the other end thereof and a small-diameter tubular portion formed integrally with the aforesaid bottom wall portion are formed, and a plurality of fluid passing holes are formed in the aforesaid bottom wall portion; a process of preparing a diaphragm, in which an armature is fixed to on one surface thereof and a spring receiving plate is fixed to the other surface thereof; a process of preparing a spring casing having a tubular portion forming a spring chamber, a flange extending outwardly in the radial direction from this tubular portion and a tubular portion disposed on an end portion of an opening, which extends in the axial direction from the flange; a process, in which supports of a supporting slider rested on a floating block mounted in a receiving chamber of a lower die for forming through a supporting spring are made to extend through the aforesaid fluid passing holes of the aforesaid housing, whereby the aforesaid housing is rested on the aforesaid supporting slider; a process of setting a ball valve body into the aforesaid housing; a process of making the aforesaid armature engaged with aforesaid supports, whereby the aforesaid diaphragm is rested on the aforesaid supports; a process, in which the aforesaid spring casing is set in a receiving cavity of an upper punch for forming, which is relatively, vertically movably disposed at a position upwardly of the aforesaid lower die for forming, with a tubular portion at an end portion of an opening of the aforesaid spring casing being opposed to the aforesaid housing; a process in which the aforesaid upper punch for forming is relatively, approachingly moved toward the aforesaid lower die for forming in a state where a coil spring for regulating pressure is interposed between the aforesaid casing and the aforesaid spring receiving plate, whereby the aforesaid diaphragm is pressed through the aforesaid coil spring for regulating pressure, whereby the outer peripheral portion of the aforesaid diaphragm is brought into contact with the aforesaid flange of the housing; and a process, in which the relatively approaching movement of the aforesaid upper punch for forming toward the aforesaid lower die for forming is continued, whereby the end portion of the opening of the aforesaid casing is bent to an end face of the aforesaid housing and staked under the cooperation between the aforesaid upper punch for forming and the aforesaid lower die for forming, wherein the aforesaid housing, the aforesaid diaphragm and the aforesaid casing are assembled with one another in a state where the aforesaid diaphragm is positioned by the aforesaid supports of the supporting slider.

In the method of manufacturing a pressure regulator according to the present invention, the diaphragm is positioned with the housing in a state where the diaphragm is supported by supports of a slide assembly, and, in this state, the casing is staked to the housing so that the diaphragm together with the housing can be fastened by the casing. With this arrangement, even with the diaphragm whose outer peripheral portion thereof is not provided with the annular rib, the diaphragm can be fastened to the housing while preventing the outer peripheral portion of the diaphragm from being bitten into the casing. The diaphragm having no annular rib can be used so that the pressure regulator including the diaphragm can be manufactured effeciently and at low costs.

Other features and advantages of the present invention will become readily apparent from the following written description and drawings.

DESCRIPTION OF THE PREFERRED EMBODIMENT

Figure 1:
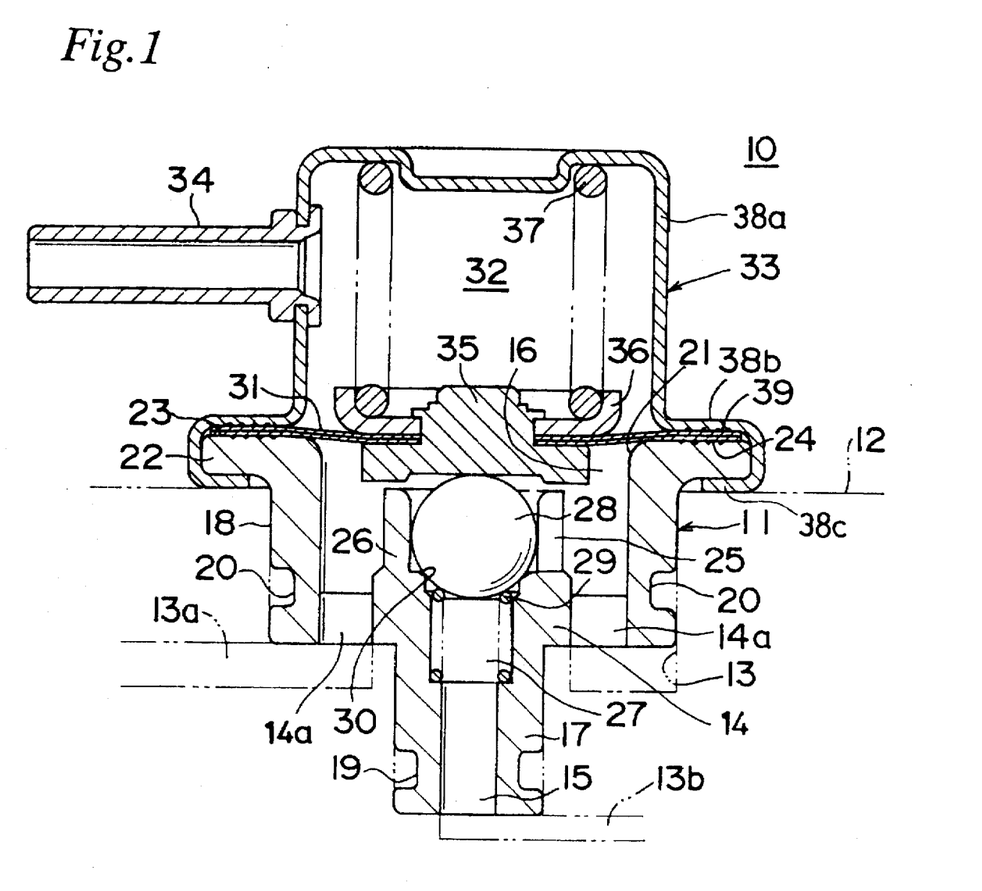
FIG. 1 is a sectional view showing the pressure control valve.
Figure 2:
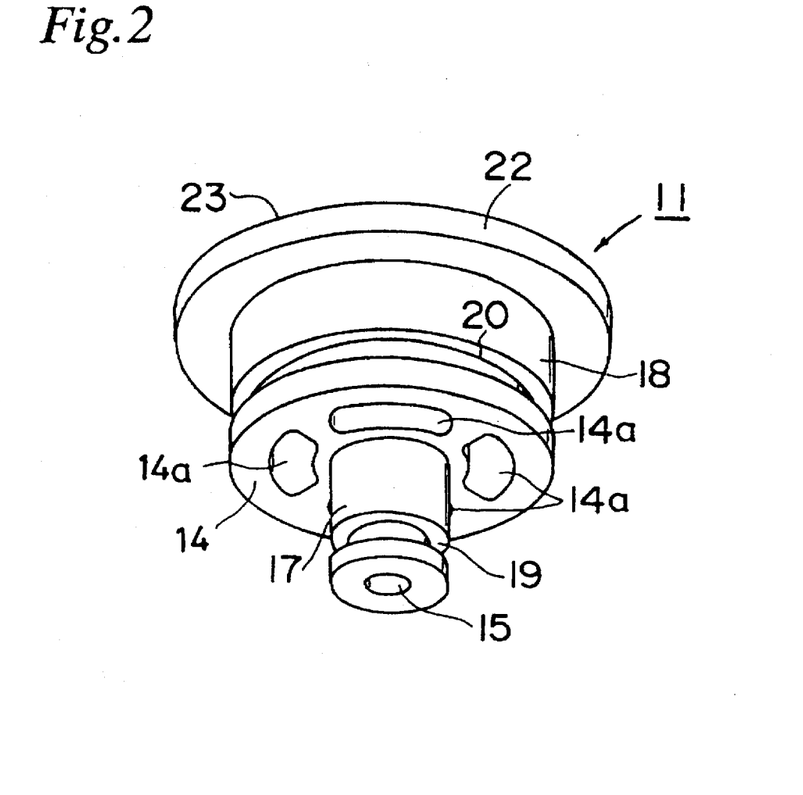
FIG. 2 is an oblique view showing the housing shown in FIG. 1.

A pressure control valve 10 shown in FIG. 1 is provided in a fuel supply path for supplying the fuel in a fuel tank of a motor car to an engine and used for controlling the fuel pressure. This pressure control valve 10 has a valve housing 11 embedded in a recess 13 formed in a pipe 12. The housing 11 has a large-diameter tubular portion 18 provided at one end thereof with a bottom wall portion 14 and at the other end thereof with a flange portion 22 and a small-diameter tubular portion 17 formed integrally on the bottom wall portion 14 and extending in the interior of the large-diameter tubular portion 18 and outwardly of the bottom wall portion 14, and formed integrally through a diecast method by use of aluminium. alloy or a cool forging method. As shown in FIG. 2, four circularly arcuate-shaped fluid passing holes 14a are arranged at regular intervals in the circumferential direction on the bottom wall portion 14 of the housing 11.

As shown in FIG. 1, in a state where the housing 11 is embedded in the recess 13, a fuel supply path 13a is communicated with a pressure control chamber 16 formed between the large-diameter tubular portion 18 and a small-diameter tubular portion 17 through fluid passing holes 14a, and a fuel discharge path 15 formed in the small-diameter tubular portion 17 is communicated with a fuel sending-out path 13b. In order to avoid the fuel leakage, O-rings are mounted to annular grooves 19 and 20 formed on the small-diameter tubular portion 17 and the large-diameter tubular portion 18, respectively.

The large-diameter tubular portion 18 is provided at an end portion thereof with an opening 21, and an end face of the flange portion 22 is turned to be a diaphragm mounting surface 23, in which a plurality of annular grooves 24 are formed in a small depth and concentrically. Some portion of the small-diameter tubular portion 17 disposed within the large-diameter tubular portion 18 is turned to be a pole portion, i.e. holder portion 26 for receiving a steel ball valve body 28, and four slits 25 for communicating the pressure control chamber 16 with the fuel discharge path 15 are formed in this holder portion 26.

A spherical-surface valve seat 30, with which the steel ball valve body 28 comes into contact, is formed in the small-diameter tubular portion 17, further, a spring receiving hole 27 adjacent to this valve seat 30 is formed, and a valve spring 29 for biasing the resilient force in a direction of separating the steel ball valve body 28 from the valve seat 30 is received in this spring receiveing hole 27.

A diaphragm 31 is mounted to the diaphragm mounting surface 23 so as to close the opening 21, and the pressure control chamber 16 is definingly formed by this diaphragm 31 and the large-diameter tubular portion 18. The outer peripheral portion of this diaphragm 31 is fastened to the flange portion 22 through a spring casing 33. In this spring casing 33, a spring chamber 32 is definedly formed on the side opposite to the pressure control chamber 16 by the diaphragm 31, and a coil spring for regulating pressure 37 is received in this spring chamber 32.

An armature 35 being in contact with the steel ball valve body 28 is secured to one surface in the center of the diaphragm 31, and a small-diameter portion of the armature 35 extends through the diaphragm 31 and is projected into the spring chamber 32. This armature 35 is moved in the axial direction by the elastic deformation of the diaphragm 31. A spring receiving plate 36 is desposed on the other surface of the diaphragm 31, and this spring receiving plate 36 is fixed to the diaphragm 31 through the small-diameter portion of the armature 35.

A return spring, i.e. a coil spring for regulating pressure 37 is fastened between this spring receiving plate 36 and an end wall of the casing 33 in a force build-up state. The diaphragm 31 is pressed against the valve body 28 by the resilient force of this spring 37, and the diaphragm 31 is pressed against the valve body 28 by this resilient force in a direction of closing the fuel discharging path 15.

A casing 33 includes a tubular portion 38a whose base end portion is closed, a flange portion 38b extending outwardly in the radial direction from the forward end of this tubular portion 38a and a tubular portion 38c at an opening end, which extends in the axial direction from the outer peripheral portion of this flange portion 38b, and is formed by working on a metallic plate by the press. A plurality of annular grooves 39 are formed to have a small depth concentrically on the forward end face of the flange portion 38b. The tubular portion 38c is staked in a state where the outer peripheral portion of the diaphragm 31 is clamped between the flange portion 22 of the housing 11 and the flange portion 38a of the casing 33, whereby both the diaphragm 31 and the casing 33 are fastened to the flange portion 22 of the housing 11. In this state, a portion of the diaphragm 31 enters into the annular groove 24 of the housing and the annular groove 39 of the casing 33, and airtight in the pressure control chamber 16 and the spring chamber 32 is reliably maintained by the diaphragm 31.

The above-described pressure control valve 10 is operated as follows. For example, when negative pressure is introduced into the spring chamber 32 from the control port 34 and the fuel pressure in the pressure control chamber 16 becomes relatively high, the diaphragm 31 is deformed toward the spring chamber 32 against the resilient force of the coil spring for regulating pressure 37. At this time, the valve body 28 is moved toward the diaphragm 31 by the resilient force of the valve spring 29 to leave a surface of the valve seat 30 so that an inlet of the fuel discharge path 15 is opened. That is, a valve-opened state, in which the fluid passing holes 14a and the fuel discharge path 15 are communicated with each other through the pressure control chamber 16, is brought about, whereby the fuel in the fuel supply path 13a flows into the fuel discharge path 15 through the fluid passing holes 14a.

Description will hereunder be given of the system for manufacturing the above-described pressure control valve.

Figure 3:
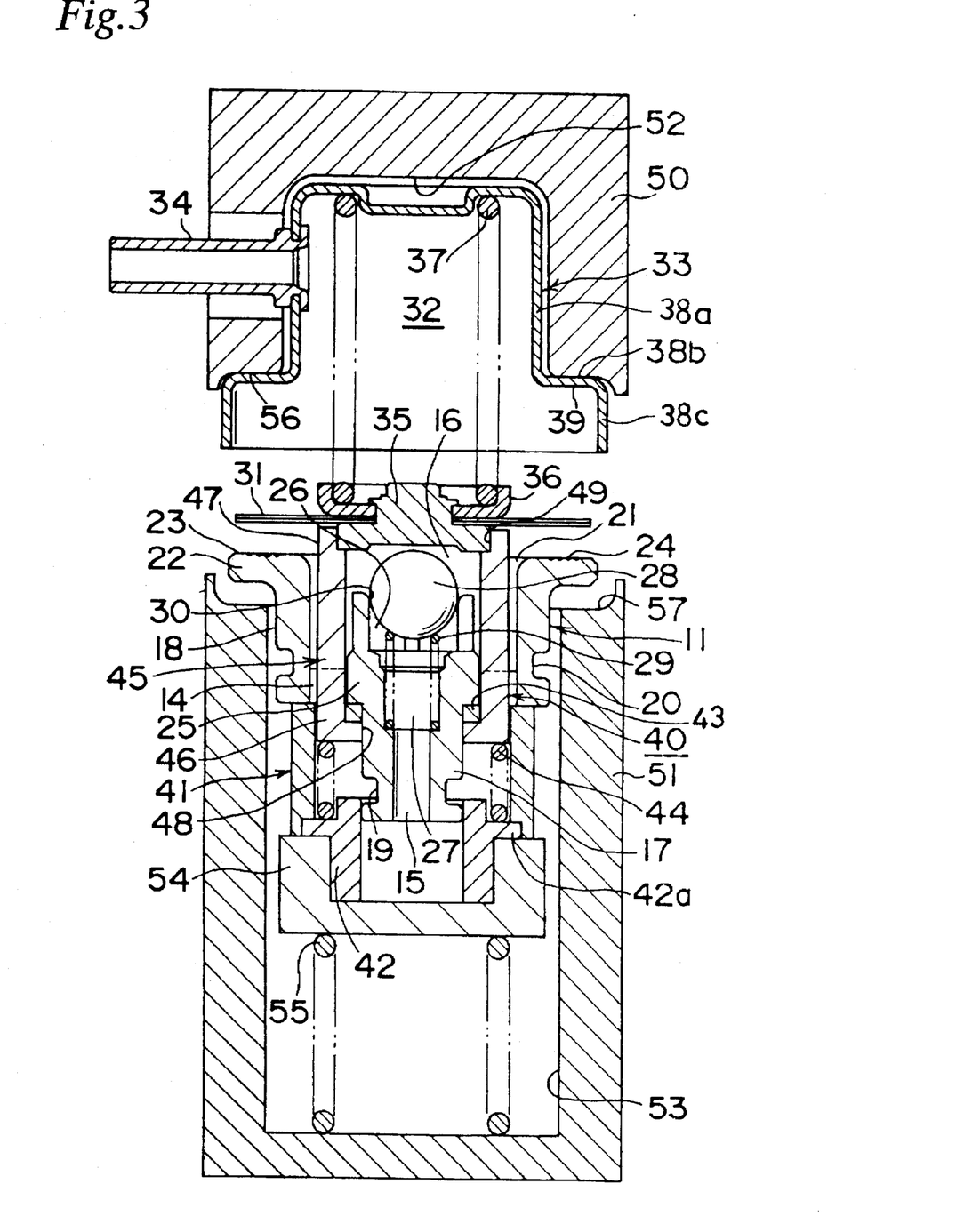
FIG. 3 is a sectional view showing a system for manufacturing in a state where a punch is lowered and moved toward a die, on which members constituting the pressure regulator are set.

As shown in FIG. 3, the system for manufacturing the pressure control valve comprises an upper punch for forming 50 and a lower die for forming 51, and the upper punch for forming 50 is vertically moved by a cylinder device, not shown, at a position upwardly of the lower die for forming 51 and approachingly or detachably movable with respect to the lower die for forming 51. The lower die for forming 51 is formed to provide a bottomed cylindrical shape and includes a receiving chamber 53. A floating block 54 is rested on a floating spring 55 in this receiving chamber 53, and this floating block 54 is vertically movable.

Figure 7:
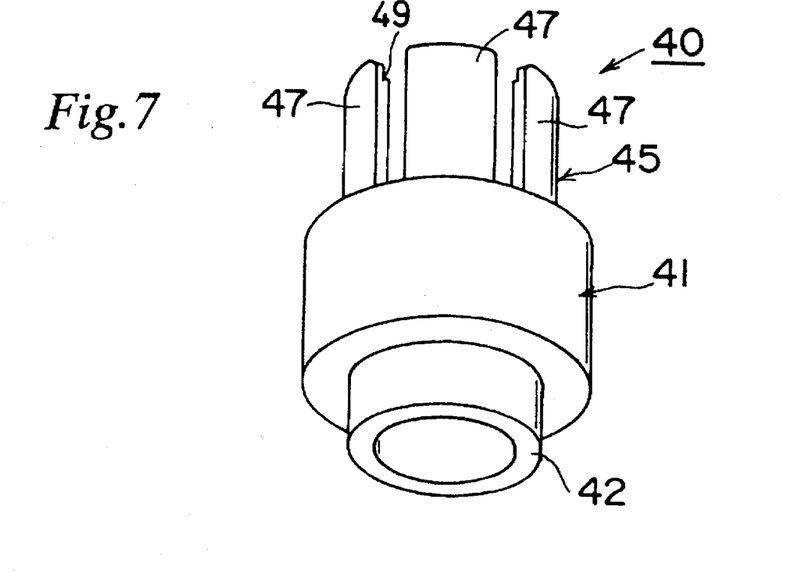
FIG. 7 is an oblique view showing the slide assembly of the system for manufacturing.
Figure 8:
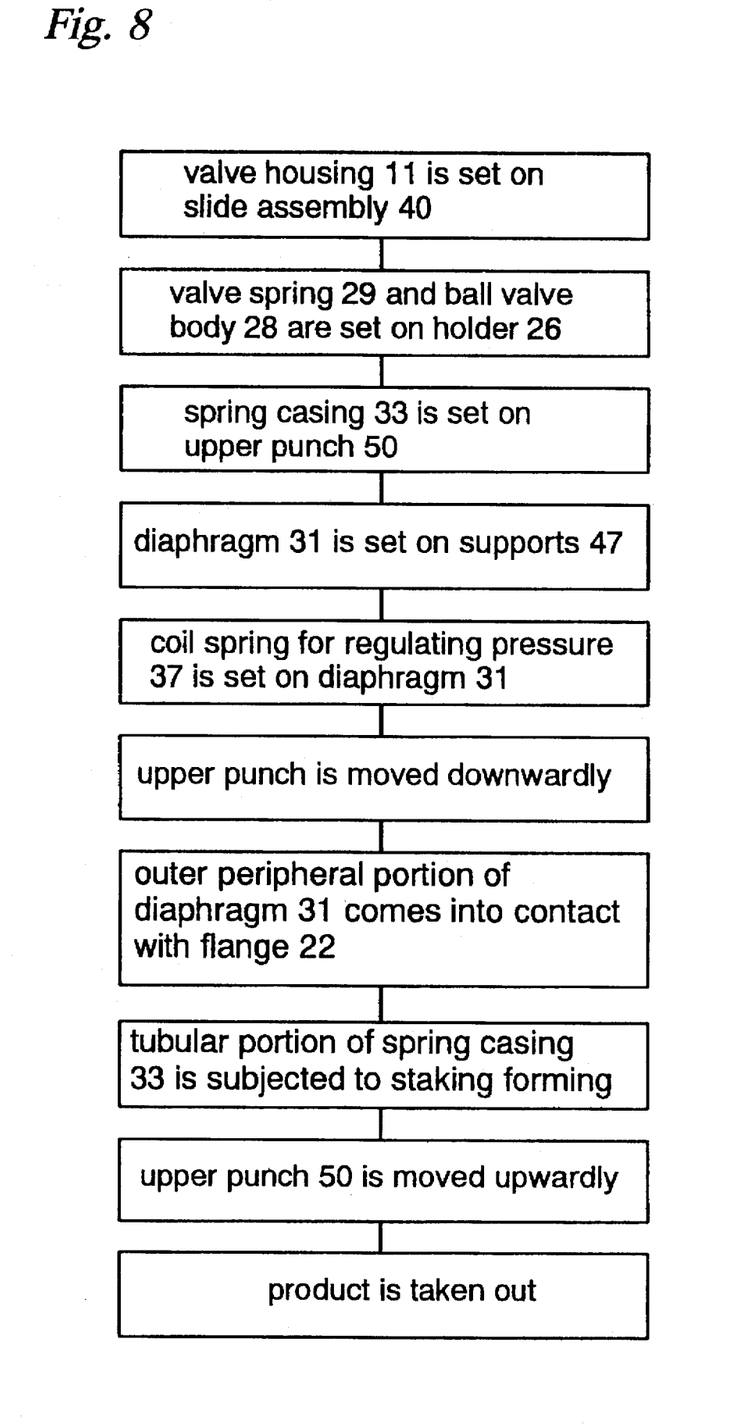
FIG. 8 is a flow chart showing the processes of manufacturing the pressure control valve shown in FIG. 1.

A slide assembly 40 is secured to the floating block 54, and this slide assembly 40 has a tubular retainer 42 formed thereon with a flange portion 42a. A tubular supporting base 41 is coupled to the lower end portion of the flange portion 42a, and a top wall portion 43 is provided on the top end portion of this supporting base 41. FIG. 7 shows the slide assembly 40, in which a supporting slider 45 is vertically slidably mounted in the supporting base 41, and a supporting spring 44 is interposed between the supporting slider 45 and the retainer 42. As shown in FIG. 3, the supporting slider 45 includes a bottom wall portion 46 and four supports 47 extending in the axial direction from the outer peripheral portion of the bottom wall portion 46, and an insertion hole 48 is formed in the bottom wall portion 46.

The respective supports 47 extend through a through-hole formed in the top portion 43 of the supporting base 41. The supports 47 are formed to provide circularly arcuate shapes in cross-section slightly smaller than the cross-sectional shape of the fluid passing holes 14a such that the supports 14 can be inserted through the fluid passing holes 14a formed in the bottom wall portion 14 of the housing 11 as shown in FIG. 7.

The height of the respective supports 47 is set to be longer than the length in the axial direction of the large-diameter tubular portion 18 of the housing 11, and, in a state where the supports 47 are inserted into the fluid passing holes 14a to the most, the upper end portions of the rupports 47 are projected above the diaphragm mounting surface 23 of the housing 11. Recesses for positioning 49 are formed on the inner peripheries at the top end portions of the respective supports 47, and the armature 35 of the diaphragm 31 is engageable with the recesses 49.

The upper punch for forming 50 is formed therein with a receiving cavity 52 slightly larger than the casing 33 in order to receive the casing 33, and, in a state where the casing 33 is received in the receiving cavity 52, a flange portion 38b of the casing 33 comes into contact with the bottom end face of the upper punch for forming 50.

A recess 57 is formed on the top end face of the lower die for forming 51, and the top face of the lower die for forming 51 is turned to be a staking forming surface having a curved shape in cross-section by this recess 57. A recess 56 is formed on the bottom end face of the upper punch for forming 50 in association with the recess 57 of the lower die for forming 51, and the bottom face of the upper punch for forming 50 is turned to be a staking forming surface having a curved shape in cross-section by this recess 56.

The springy force, i.e. the resilient force of the floating spring 55 is set to be higher than the springy force of the spring for regulating pressure 37, and the springy forces of the supporting spring 44 and the valve spring 29 are set to be lower than the springy force of the spring for regulating pressure 37, respectively.

Description will be given of the method of manufacturing by use of the above-described system for manufacturing with reference to FIGS. 3 to 8.

The housing 11 and the casing 33 are previously formed to provide shapes shown in FIG. 3, and the diaphragm 31 is previously assembled thereto with the armature 35 and the spring receiving plate 36 as shown in FIG. 3 after the manufacture.

Firstly, as shown in FIG. 3, the housing 11 is set, with the diaphragm mounting surface 23 being directed upwardly, on the slide assembly 40 which is assembled into the receiving chamber 53 of the lower die for forming 51. At this time, the housing 11 is rested on the supporting base 41, the respective supports 47 of the supporting slider 45 are inserted through the fluid passing holes 14a, respectively, and the small-diameter tubular portion 17 is inserted into the insertion hole 48 of the supporting slider 45. In this state, the supporting slider 45 is guided by the inner peripheral surface of the supporting base 41 and raised to the position at the end of the rise by the supporting spring 44, whereby the top end portions of the respective supports are projected upwardly from the opening 21 of the housing 11.

Subsequently, the valve spring 29 and the spherical valve body 28 are assembled from above into the holder 26 of the housing 11. However, the valve spring 29 and the spherical valve body 28 may be previously assembled into the housing 11 before the housing 11 is set on the slide assembly 40.

On the other hand, as shown in FIG. 3, the casing 33 is mounted to the receiving cavity 52 of the upper punch for forming 50. Mounting of the casing 33 to the upper punch for forming 50 may be made before the housing 11 is set on the slide assembly 40 or after that.

Subsequently, the armature 35 of the diaphragm 31 is engaged with the recesses 49 of the respective supports of the supporting slider 45. With this arrangement, the diaphragm 31 is supported by the supports through the armature 35 and brought into a state where the diaphragm 31 is positioned at a predetermined position with respect to the flange portion 22 of the housing 11.

Subsequently, the spring for regulating pressure 37 is rested on the spring receiving plate 36 of the diaphragm 31. However, the spring for regulating pressure 37 may be previously fixed in the casing 33.

In the state where the members constituting the pressure control valve 10 are set as described above, the upper punch for forming 50 is moved downwardly, approaching the lower die for forming 51. FIG. 3 shows a state where, until the casing 33 comes into contact with the spring for regulating pressure 37, the upper punch for forming 50 approaches the lower die for forming 51. When the upper punch for forming 50 approaches still more, because the resilient force of the supporting spring is set to be lower than the resilient forces of the floating spring 55 and the spring for regulating pressure 37, the supporting slider 45 is pushed down by the spring for regulating pressure 37 through the diaphragm 31, whereby the armature 35 comes into contact with the steel ball valve bldy 28.

Figure 4:
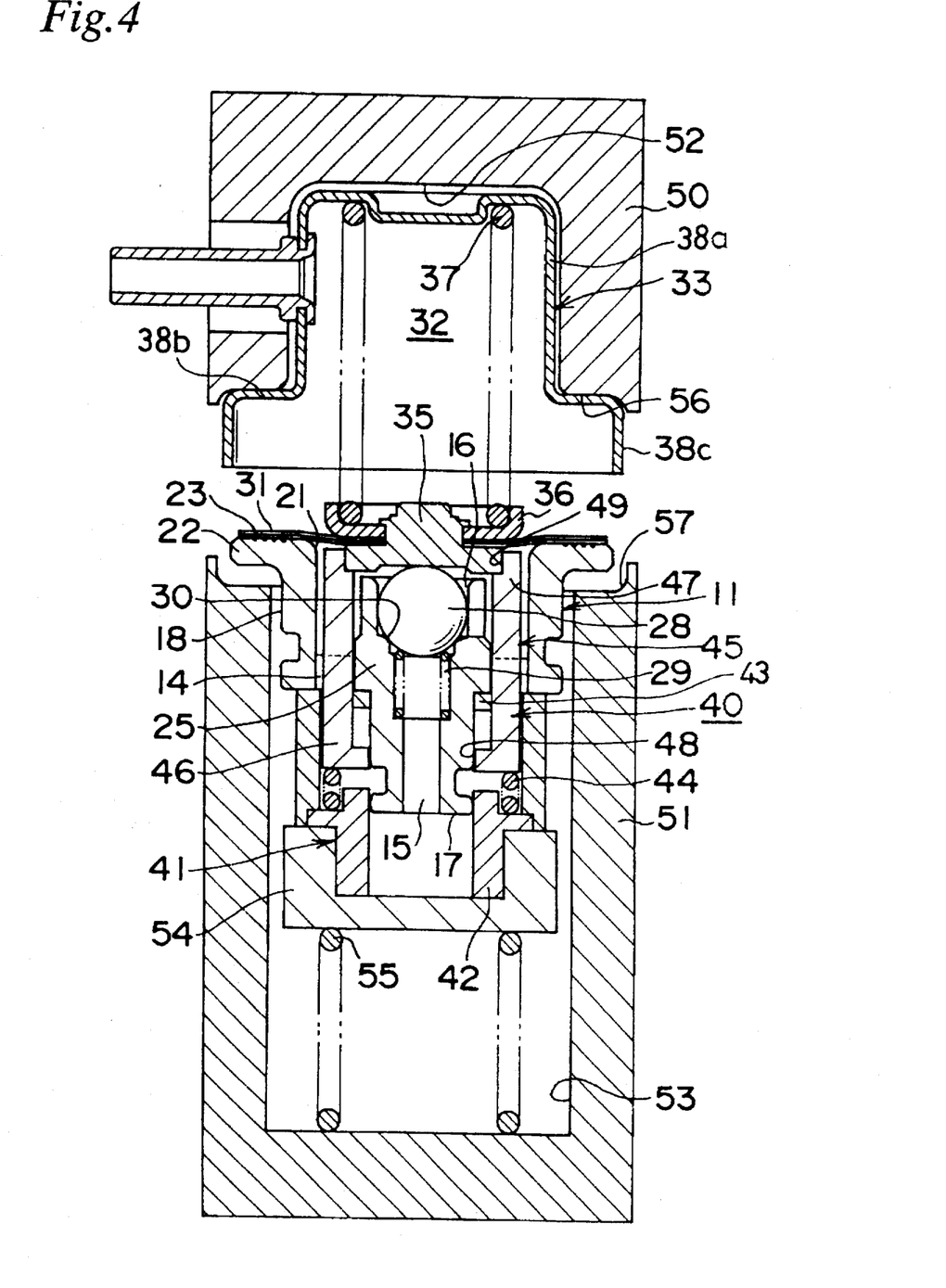
FIG. 4 is a sectional view showing the system for manufacturing in a state where the punch is lowered and moved as far as the outer peripheral portion of the diaphragm comes into contact with the flange portion of the casing.

When the punch 50 is lowered to a position shown in FIG. 4 by the continued approaching movement of the punch 50, the supporting spring 44 is further constracted and brought into a state where the spherical valve body 28 is abutted against the valve seat surface 30. In this state, the top ends of the respective supports 47 of the supporting slider 45 are brought into a state where the top ends of the supports 47 sink below the opening 21 of the housing 11, whereby the bottom surface of the outer peripheral portion of the diaphragm 31 is brought into a state of being abutted against the diaphragm mounting surface 23 of the housing 11. With this arrangement, the diaphragm 31 is positioned at a predetermined position with respect to the housing 11.

The slide assembly 40 is floatingly supported by the floating spring 55 at this time, whereby the bottom end face of the flange portion 22 of the housing 11 is slightly floating up from the recess 57 for staking of the die 51.

Figure 5:
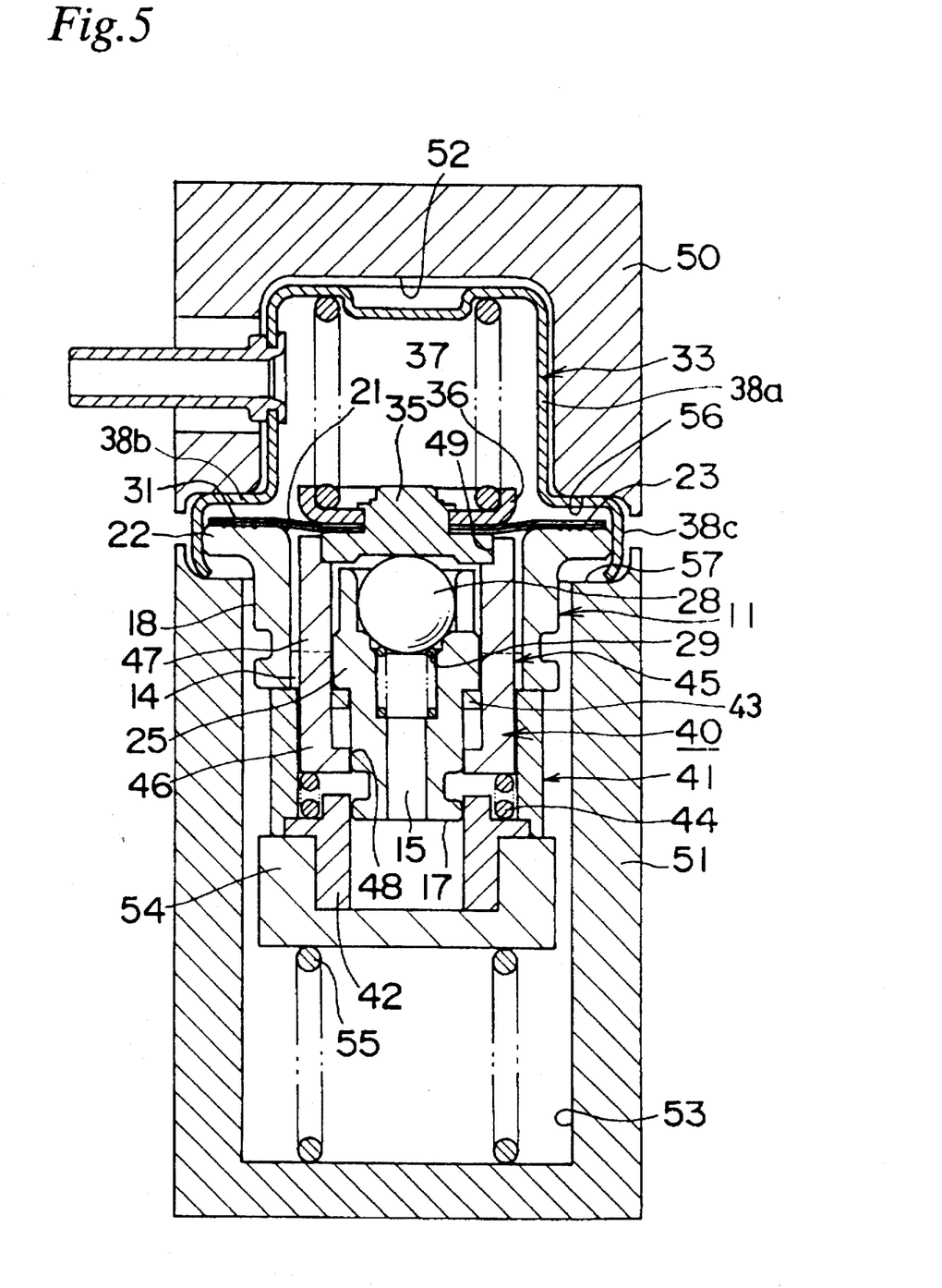
FIG. 5 is a sectional view showing the system for manufacturing in a state where the tubular portion of the casing is staked.

Further, due to the approaching movement of the punch 50 toward the die 51, as shown in FIG. 5, the spring for regulating pressure 37 mounted between the casing 33 and the spring receiving plate 36 of the diaphragm 31 is constracted, and, when the tubular portion 38c at the opening end of the casing 33 passes through the flange portion 22, and thereafter, the tubular portion 38c is abutted against the recess 57 for staking forming of the die 51, the tubular portion 38c is curled so as to be wound in toward the bottom surface of the flange portion of the housing 11 by the punch 50 and the die 51 so that the staking forming work is carried out.

Figure 6:
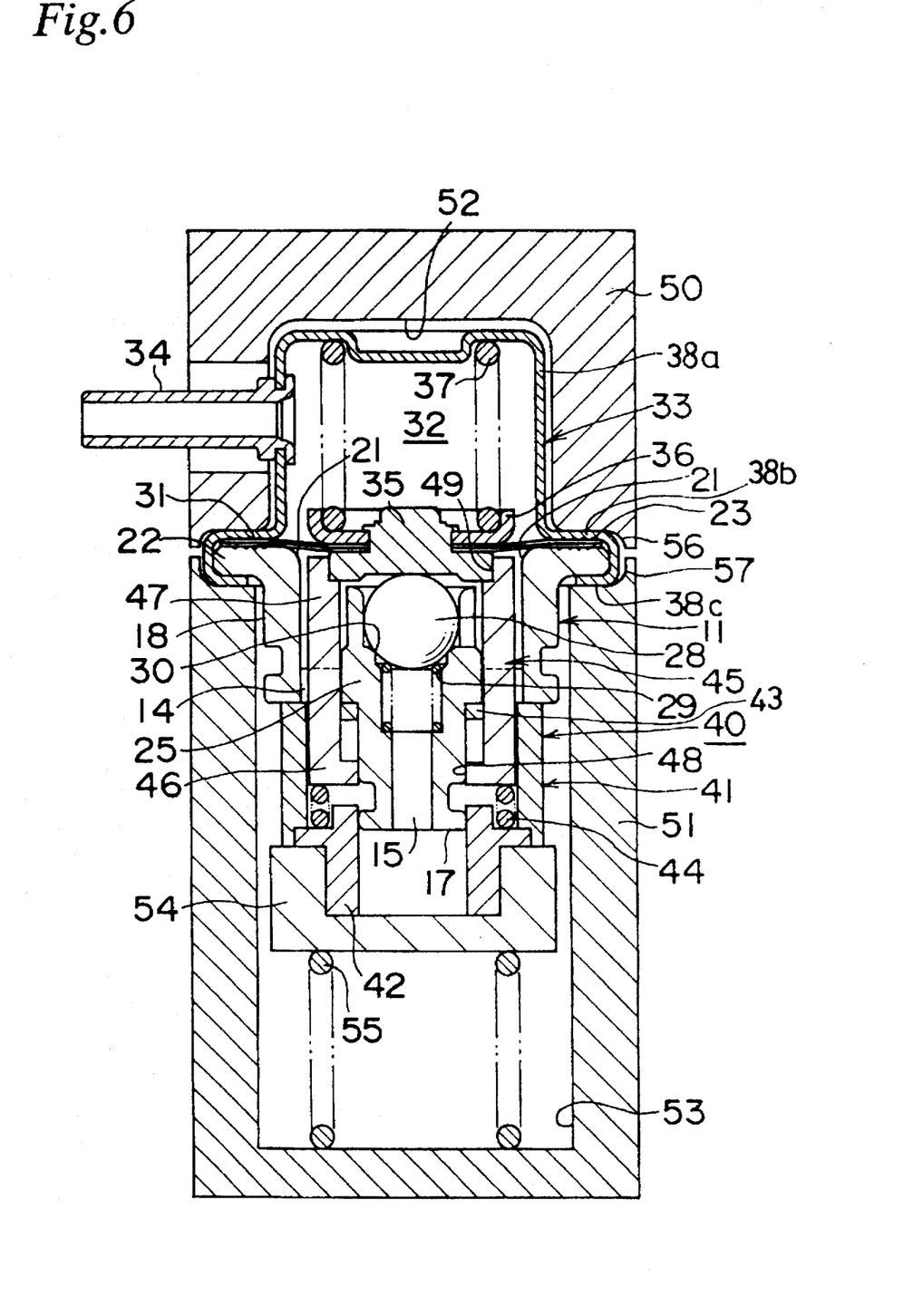
FIG. 6 is a sectional view showing the system for manufacturing in a state where the staking work is completed.

FIG. 6 shows a state where the rolling staking forming of the tubular portion 38c is completed as described above. In this state, the floating spring 55 is slightly contracted, whereby the slide assembly 40 slightly sinks down in the receiving chamber 53 of the die 51 so that the housing 11 is pushed down along with the downward movement of the punch 50. As a result, the tubular portion 38c of the casing 33, which is rolling staking-formed, is brought into a state of being clamped between the bottom surface of the flange portion 22 of the housing 11 and the staking recess 57 of the die 51 so that the rolling staking work is completed.

In this staking forming work, the housing 11 is brought into a state where the housing 11 is strongly pressed against the flange portion 38b of the casing 33 by the floating spring 55 through the outer peripheral portion of the diaphragm 31. By applying the pressing force of a predetermined value to the punch 50, staking forming is carried out. When the staking forming is completed, a space is formed between the punch 50 and the die 51 as shown in FIG. 6, whereby these members are prevented from impinging against each other.

As described above, the diaphragm 31 together with the casing 33 are fastened to the housing 11. In this case, the outer peripheral portion of the armature 35 is supported in a state where the outer peripheral portion is positioned by the respective supports of the supporting slider 45, whereby shifts in position between the diaphragm 31 and the casing 33 together with the housing 11 can be avoided so that the diaphragm 31 together with the casing 33 can be fastened to the housing 11 while the diaphragm 31 is prevented from biting into a space formed between the tubular portion 38c and the outer peripheral portion of the flange portion 22.

When the staking work is completed, the punch 50 is raised, and thereafter, a product is taken out of the die 51. As described above, the pressure control valve 10 as shown in FIG. 1 is manufactured.

Figure 9:
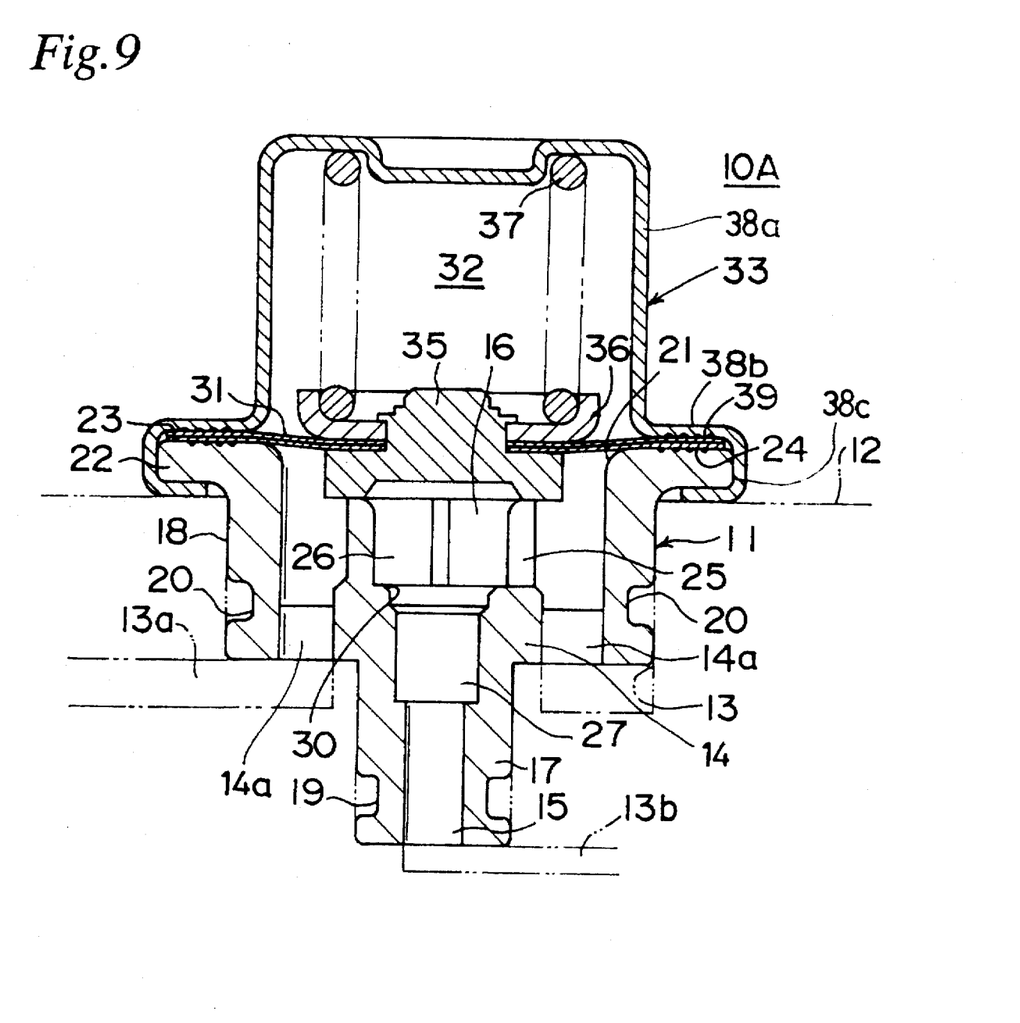
FIG. 9 is a sectional view showing a fuel damper as being the pressure regulator produced by the method of manufacturing according to the present invention.

FIG. 9 shows a fuel damper 10A as another example of the pressure regulator produced by the method of manufacturing according to the present invention. In FIG. 9, same reference numerals are used to designate the members commonly used for the members constituting the pressure control valve as shown in FIG. 1.

This damper 10A is secured between the fuel supply path 13a and the fuel sending-out path 13b in order to attenuate the pulsations of the discharging pressure of the fuel pump. This fuel damper 10A is identical with the pressure control valve 10 except for lacking of the spherical valve body 28 and the valve spring 29, which are included in the pressure control valve 10 shown in FIG. 1.

This fuel damper 10A can be assembled up in accordance with the same procedure by use of the above-described system for manufacturing.

Incidentally, the present invention should not necessarily be limited to the above-described embodiment, and, needless to say, can be modified variously within the scope not departing from the technical gist. For example, in the illustration, the punch 50 is approachingly moved toward the die 51; however, the punch may be turned to be of a fixed type and the die 51 may be vertically, approachingly or detachably moved toward or from the punch 50.

What is claimed is:

1. A method of manufacturing a pressure regulator, said pressure regulator including: a housing having a large-diameter tubular portion provided at one end thereof with a bottom wall portion and at the other end thereof with a flange and a small-diameter tubular portion formed integrally on said bottom wall portion being provided therein with fluid wall passing holes; a diaphragm disposed at an end face of said flange definedly formed by said flange and said housing, and definingly forming a pressure control chamber for communicating a fluid flow path in said small-diameter tubular portion with said fluid passing holes; and a spring casing clamping the outer peripheral portion of said diaphragm, being staked to said housing and definingly forming a spring chamber by said diaphragm and itself, said method of manufacturing comprising:

a process, in which supports of a supporting slider rested on a floating block through a supporting spring, which is mounted in a receiving chamber of a lower die for forming are made to extend through said fluid passing holes of said housing, and said housing is rested on said supporting slider;

a process of resting said diaphragm on said supports;

a process, in which said spring casing is set in a receiving cavity of an upper punch for forming relatively, vertically movably disposed at a position upwardly of said lower die for forming, with an end portion of an opening of said spring casing being opposed to said housing;

a process, in which, by relatively, approachingly moving said upper punch for forming toward said lower die for forming, said diaphragm is pressed through a coil spring for regulating pressure, which is assembled in said spring casing, whereby the outer peripheral portion of said diaphragm is brought into contact with said flange of said housing; and a process, in which the relatively approaching movement of said upper punch for forming toward said lower die for forming is continued, whereby the end portion of the opening of said casing is bent to an end face of said housing under the cooperation between said upper punch for forming and said lower die for forming so that a staking forming is carried out.

2. A method of manufacturing as set forth in claim 1, wherein said method comprises a process, in which a ball valve body constituting a pressure control valve is set in said small-diameter tubular portion of said housing.

3. A method of manufacturing as set forth in claim 1, wherein an armature is secured to the central portion of said diaphragm, and such a process of staking forming is carried out that said casing and said housing clamp the outer peripheral portion of said diaphragm in a state where said diaphragm is rested on said supports through said armature, whereby said diaphragm is positioned.

4. A method of manufacturing as set forth in claim 1, wherein a slide assembly is secured onto a floating block mounted in said receiving chamber of said lower die for forming, applied thereto with a resilient force higher than a resilient force of said coil spring for regulating pressure in said casing to thereby be moved toward said upper punch for forming, and includes a supporting slider provided with said supports and vertically movable.

5. A method of manufacturing as set forth in claim 1, wherein the top end face of said lower die for forming has a staking forming portion for bendingly working on an end portion of an opening of said casing.

6. A method of manufacturing a pressure control valve, comprising:

a process of preparing a housing including a large-diameter tubular portion provided at one end thereof with a bottom wall portion and at the other end thereof with a flange and a small-diameter tubular portion formed integrally on said bottom wall portion, with said bottom wall portion being formed with fluid passing holes;

a process of preparing a diaphragm fixed at one surface thereof with an armature and at the other surface thereof with a spring receiving plate;

a process of preparing a spring casing including a tubular portion forming a spring chamber, a flange extending outwardly in the radial direction from said tubular portion and a tubular portion disposed at an end portion of an opening extending in the axial direction from said flange;

a process, in which supports of a supporting slider rested on a floating block through a supporting spring, which is mounted in a receiving chamber of a lower die for forming, are made to extend through said fluid passing holes of said housing, and said housing is rested on said supporting slider;

a process of setting a ball valve body into said housing;

a process, in which said armature is engaged with said supports and said diaphragm is rested on said supports;

a process, in which said spring casing is set in a receiving cavity of an upper punch for forming relatively, vertically movably disposed at a position upwardly of said lower die for forming, with a tubular portion disposed at an end portion of an opening of said spring casing being opposed to said housing;

a process, in which said upper punch for forming is relatively, approachingly moved toward said lower die for forming in a state where a coil spring for regulating pressure is interposed between said casing and said spring receiving plate, whereby said diaphragm is pressed through said coil spring for regulating pressure so that the outer peripheral portion of said diaphragm is brought into contact with said flange of said housing; and a process, in which the relatively approaching movement of said upper punch for forming toward said lower die for forming is continued, whereby a tubular portion at the end portion of the opening of said casing is bent to an end face of said housing so that a staking forming is carried out wherein said housing, said diaphragm and said casing are assembled together in a state where said diaphragm is positioned by said supports of said supporting slider.

7. A method of manufacturing as set forth in claim 6, comprising a process, in which said coil spring for regulating pressure is rested on said spring receiving plate of said diaphragm.

8. A method of manufacturing as set forth in claim 6, comprising a process, in which said coil spring for regulating pressure is previously secured to said casing.

9. A method of manufacturing as set forth in claim 6, wherein said floating block is rested on a floating spring and the resilient force of said floating spring is set to be higher than that of said coil spring for regulating pressure, and the resilient force of said supporting spring is set to be lower than that of said coil spring for regulating pressure.

* * * * *